June 19, 1956 O. H. SCHUCK 2,751,541
AUTOMATIC FLIGHT CONTROL APPARATUS
Filed Jan. 16, 1952 2 Sheets-Sheet 1
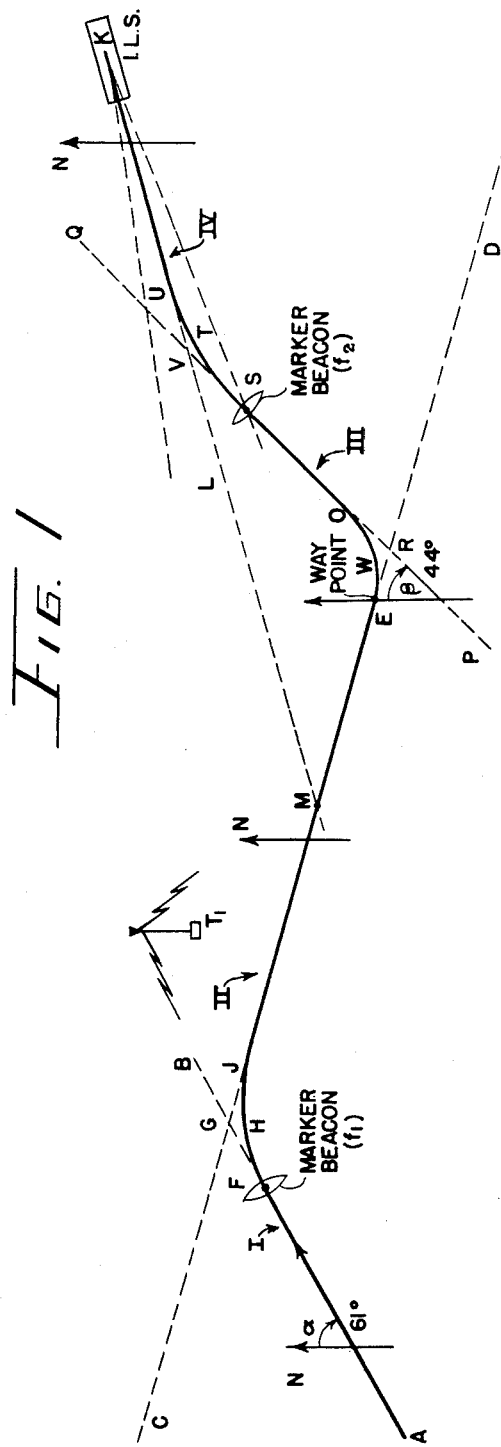
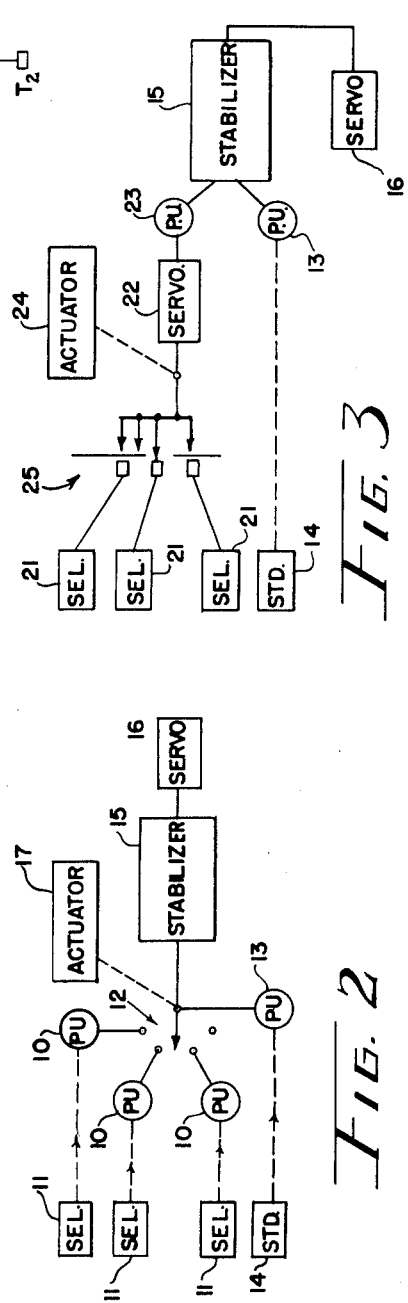
*INVENTOR.*
OSCAR HUGO SCHUCK
BY
George H. Fisher
*ATTORNEY*

June 19, 1956

O. H. SCHUCK 2,751,541

AUTOMATIC FLIGHT CONTROL APPARATUS

Filed Jan. 16, 1952

INVENTOR.
OSCAR HUGO SCHUCK
BY
George H Fisher
ATTORNEY

United States Patent Office 2,751,541
Patented June 19, 1956

2,751,541

AUTOMATIC FLIGHT CONTROL APPARATUS

Oscar Hugo Schuck, Minneapolis, Minn., assignor to Minneapolis-Honeywell Regulator Company, Minneapolis, Minn., a corporation of Delaware Application January 16, 1952, Serial No. 266,699

7 Claims. (Cl. 318—489)

This invention relates to the field of automatic control of aircraft in flight, and more particularly to presettable means for controlling a number of the characteristics of flight of the craft so that they have desired conditions in each of a substantially unlimited number of portions of an extended flight.

It is of course well known in the field of aircraft control to maintain at desired values various flight characteristics of a dirigible craft: heading, airspeed, altitude, position relative to a desired ground track, and pitch and roll attitudes are some of the flight characteristics with respect to which such control has in the past been exercised.

It is also true that previous means have been developed for controlling certain of these and other characteristics according to successive desired overall states of the craft in successive portions of a long flight, automatic means being provided for substituting one set of controls for another as the craft passes from one portion of the flight to the next. A rudimentary system for performing this function is outlined in "Automatic aircraft control" by James L. Anast, published in the July 1948 issue of Aeronautical Engineering Review: the present invention constitutes an improvement on the structure there described.

The inventive contribution herein centers about control of an aircraft in accordance with perforations in a record strip. A field of such perforations is provided having a portion for the control of each of the several variables under consideration, and a succession of such fields are punched into the strip for sequential control of those variables as the strip is advanced. Control of the flight of a craft in accordance with "punched card" techniques is entirely new in the field of aircraft engineering, and comprises a major object of the invention.

A second, related major portion of the invention is the use of a single signal source in connection with a certain portion of each of the fields of perforations. In the prior art it is known to have an independent signal source, manually preset, for each value of each characteristic to be controlled. This means that for control of six flight characteristics through a flight of six portions, for example, thirty-six separate signal sources such as presettable voltage dividers are required. When it is realized that, because of the need for control of altitude, airspeed, flaps, brakes, landing gear, etc., the mere take-off and landing of an aircraft may each comprise four or five distinct "portions" of a flight, it will be at once appreciated that just the volume occupied by the required signal sources is in itself a limitation on the length of a flight which can be automatically controlled with the earlier system.

Other disadvantages of the earlier system are the need for a multi-pole switch of the telephone selector type having as many separate positions as there are portions of the flight, and the requirement of a separate signal source for each characteristic in each portion of the flight, even though the value of the characteristic may and often does remain unchanged.

It is another object of the invention to provide an improved automatic aircraft control arrangement in which the defects of prior arrangements are avoided by supplying only a single signal source for one of the characteristics to be controlled, no matter how many different values it is to have in successive portions of a long flight, and then providing motor means for adjusting the signal source to various positions as called for by the perforations in a record strip of unlimited length.

It is an object of the invention to provide means for bringing a flight characteristic of an aircraft to a value selected in accordance with digitally significant perforations in a record sheet.

It is a further object of the invention to provide means for bringing an aircraft to a heading selected in accordance with digitally significant perforations in a record sheet.

It is a further object of the invention to provide means as just described including a succession of sets of such perforations in the record sheet, and means sequentially controlling the heading of the aircraft in accordance with the perforations making up successive sets thereof.

Yet another object of the invention is to provide heading control means for an aircraft including a control member whose position determines the heading of the craft, a selector adjustable in accordance with the digits of a heading angle, and means for positioning the control member to the angle whose digits are those selected.

A still further object of the invention is to provide heading control means for an aircraft including a control member whose position determines the heading of the craft; a selector adjustable in accordance with the digits of an unlimited succession of heading angles, and means for successively positioning the control member to successive angles whose digits are those selected.

A still further object of the invention is to provide heading control means as just described in which each set of perforations in the sheet includes further perforations to establish a preparatory condition for subsequent automatic advance of the sheet when a selected one of a plurality of further flight conditions is attained.

A still more specific object of the invention is to provide heading control means as described above in which each field of perforations in the sheet includes perforations to determine whether the heading control shall be exerted in accordance with digitally significant perforations in the strip or in accordance with alternative heading control means independent of the perforations.

Various other objects, advantages and features of novelty which characterize my invention are pointed out with particularity in the claims annexed hereto and forming a part hereof. However, for a better understanding of the invention, its advantages, and objects obtained by its use, reference should be had to the subjoined drawing, which forms a further part hereof, and to the accompanying descriptive matter, in which I have illustrated and described a preferred embodiment of my invention.

In the drawing:

Figure 1 is a schematic showing of territory to be flown through by an aircraft equipped with the control apparatus of the present invention;

Figure 2 is a block diagram showing essential features of a prior art structure for causing flight of the craft in the manner indicated in Figure 1;

Figure 3 is a block diagram similar to Figure 2, but illustrating the operation of the apparatus according to the present invention.

Figure 4:
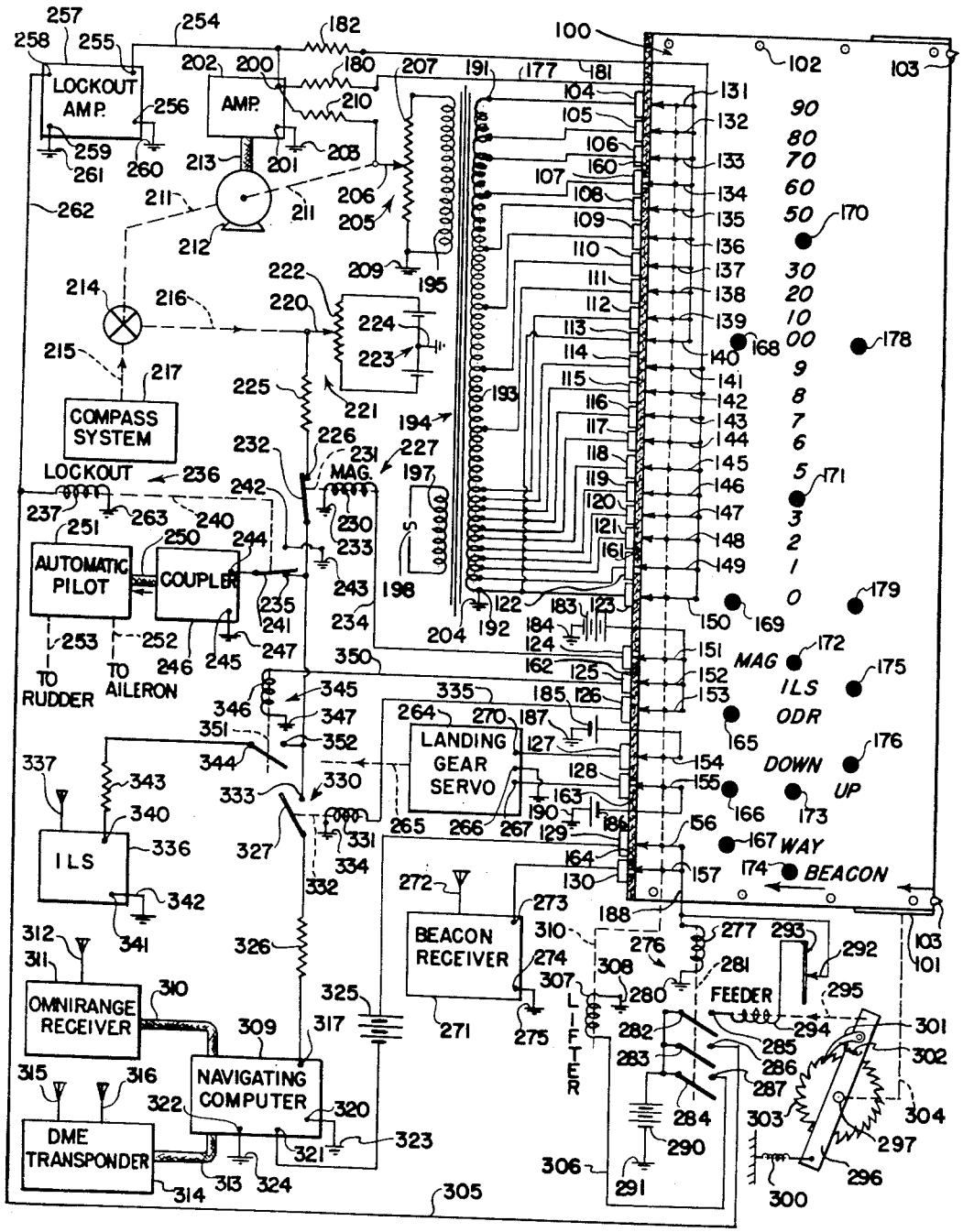
Figure 4 is a wiring diagram of apparatus comprising a portion of Figure 3.

The heavy solid line in Figure 1 illustrates a desired course to be followed by an aircraft equipped with the present invention. The course has been chosen for illustrative purposes and is not intended to represent the best course which could be laid out. The figure shows only the control desired to be exercised in azimuth; similar control of the craft's altitude, for example, might equally well be illustrated, with consequent further subdivision of the flight into a greater number of portions. It is to be understood that the path shown in the figure represents only the last part of a much longer track, and that when the craft is at point A at the left of Figure 1 it has already been moving toward A along the leftward extension of the line AB for some time.

For purposes of simplification, it will be assumed that flight is taking place in the absence of wind, so that the heading of the craft coincides with its direction of travel: means for correcting heading control apparatus for crab angle due to cross-track components of wind are well-known. The craft appearing at point A therefore is already directed along the line AB, so that its magnetic heading is α.

It is intended that the craft change its heading and follow the line CD, which is a ground track arranged for being followed by aircraft under radio supervision from a transmitter $T_1$, whose location relative to the line CD and to a point E on that line are known. This latter point is called a "way point," because in following the line CD under normal radio supervision, aircraft are transferred at point E from supervision by transmitter $T_1$ to supervision by a second transmitter $T_2$.

In order to fly smoothly, the craft being controlled by the present apparatus must leave the line AB at some point F, prior to its point G of intersection with the line CD, and proceed along a smooth, preferably tangential curve FH, to arrive at a point J on the line CD. In order to initiate the necessary change in the control of the craft, a fan marker beacon is located at point F, so that passage of the craft over the area served by the beam can be readily distinguished.

The ultimate destination of the craft is supposed to be the airport shown in the upper right-hand portion of Figure 1. This airport is equipped with the apparatus making up the conventional Instrument Landing System, and sends out a landing beam from a transmitter K, the center of the beam being indicated by the line KL; the aircraft must come onto this line some distance away from the transmitter K. The point M at which the line KL if extended would intersect the line CD is beyond the range of reliable operation for the Instrument Landing System, and in any case the way point E defines a convenient, readily identifiable point at which to depart from the line CD, so that the flight is planned to follow the line CD to E then swing off along a smooth curve EW to a point O on an arbitrarily selected line PQ which has a bearing β with respect to north, and which would intersect the line CD at some point R. By following the line PQ the craft is brought into the service area of the Instrument Landing System, and should follow a smooth curve ST from a point S on the line PQ to a point U on the line KL displaced from its point of intersection V with the line PQ.

The desired path of the craft is thus described by following the line AFHJMEWOSTUK. Of this path the portions FHJ, EWO, and STU are transition portions and have been very greatly magnified for the purpose of illustration. The four principal portions of the flight are AF, JME, OS, and UK, and are identified by the Roman numerals I, II, III, and IV, respectively. Actually the flight would be further subdivided to provide for changes in altitude, airspeed, flap position, etc., but it is felt that the invention is sufficiently disclosed with the four portions identified above.

One of the principal problems in performing flights according to plans as just described is providing means for selecting heading angles which the craft is to follow. In the prior art it has been the practice, as shown in Figure 2, to provide a number of signal sources or pick-up units 10, such for example as synchro transmitters, each with its own setting knob or selector 11, and each connected to one set of contacts of a multi-position switch 12. Whenever it is desired to proceed to a new heading, the switch is advanced to connect a different preset signal source 10 in a circuit including a further source 13 actuated by a standard of heading 14 such as a compass, and the heading stabilizer 15 of the craft then operates through one or more servos 16 to bring the craft to and maintain it on a new heading. An automatic actuator 17 is provided to advance switch 12 at suitable times.

The great improvement offered by my invention is clearly shown in Figure 3. Here a number of selectors 21 are provided as before, and actually comprise sets of perforations in a record strip. By means of these perforations varying voltages are supplied to a servo system 22 which positions a single signal source or pick-up unit 23. Actuator 24 in this case is mechanism designed to advance the record sheet so that successive sets of perforations may be used to control the servo. The output of signal source 23 is combined with the output of further signal means 13 actuated by heading standard 14, and controls heading stabilizer 15 as before. It is apparent that there is a vast reduction in the number of signal sources required, with a consequent great saving of space, and that the selectors, being merely sets of perforations in the record strip also add neither volume nor weight to the system. Switching device 25 shown in the figure is actually a set of perforation sensing contacts, which energize servo system 22 with voltages according to the locations of the perforations in the sheet.

For a more detailed disclosure of the apparatus, reference should now be made to Figure 4. The record sheet is shown at 100 to comprise a paper strip which passes over a drive roll 101 in passing from a feed roll to a take-up roll, not shown. The strip bears perforations 102 along its edges for engagement by pins 103 projecting from the drive roll 101 to give positive paper feed.

As indicated schematically by cross-hatching, the paper strip passes between a set of fixed contacts 104 to 130 inclusive, and a set of movable contacts 131 to 157 inclusive, which are normally urged into engagement with the fixed contacts. For brevity in discussion only enough contacts are shown in the upper portion of the strip to give a possible selection of heading angles with a range of 90°, but this can easily be expanded to encompass the full range of 360°, as is taught in my co-pending application serial No. 170,971, filed June 29, 1950, now Patent No. 2,515,703, dated August 16, 1955, and assigned to the assignee of the present invention.

In Figure 4 it is shown that strip 100 is provided with perforations 160—164, so that engagement is possible, with the strip in the position shown, between contacts 107 and 134, 122 and 149, 124 and 151, 128 and 155, and 130 and 157. This is the position of the strip in use when the craft is in portion I of the desired track.

Another set of perforations 165, 166, 167, 168 and 169 is provided, for permitting engagement between contacts 126 and 153, 128 and 155, 129 and 156, 113 and 140, and 123 and 150 when the strip is advanced to its next position with respect to the contacts. This is the position of the strip in use when the craft is in portion II of the desired track.

A further set of perforations 170 to 174 inclusive is provided, for permitting engagement between contacts 109 and 136, 119 and 146, 124 and 151, 128 and 155, and 130 and 157 when the strip is advanced again. This is the position of the strip in use when the craft is in portion III of the desired track.

Yet another set of perforations 175, 176, 178, and 179 is provided for permitting engagement between contacts 125 and 152, 127 and 154, 113 and 140, and 123 and 150 when the strip is once more advanced. This is the position of the strip in use when the craft is in portion IV on the desired track.

The portion of strip 100 aligned with contacts 104—123 and contacts 131—150 may be defined as the heading angle selecting portion of the strip. Similarly the portion of strip 100 aligned with contacts 124—126 and contacts 151—153 is the lateral control selecting portion of the strip, the portion aligned with contacts 127, 128 and contacts 154, 155 is the landing gear control portion of the strip, and the portion aligned with contacts 129, 130 and contacts 156, 157 is the sequence initiation selecting portion of the strip.

Movable contacts 131–140 inclusive are electrically connected to one another and, by a conductor 177, to a summing resistor 180. Movable contacts 141–150 inclusive are electrically connected to one another and, by a conductor 181, to a summing resistor 182. Movable contacts 151–153 inclusive are electrically connected to one another, and to the positive terminal of a battery 183, the other terminal of which is grounded at 184. Movable contacts 154 and 155 are electrically connected to the positive and negative terminals respectively of a pair of batteries 185 and 186, the other terminals of the batteries being grounded at 187 and 190. Movable contacts 156 and 157 are electrically connected to one another and, through a conductor 188, to a circuit which will presently be described.

Fixed contacts 104—123 are energized from the terminals 191 and 192 and a plurality of intermediate taps on a first secondary winding 193 of a transformer 194 having a further secondary winding 195 and a primary winding 197 energized from a source 198 of alternating voltage. Terminal 192 is grounded at 204 and connected to fixed contact 123, and the voltages obtainable between this terminal and the 10 successive terminals shown next above it increase in equal increments which may conveniently be one volt: these voltages appear between ground and fixed contacts 114—122. Terminal 192 is also connected to fixed contact 113: the voltages obtainable between ground and the taps succeeding those just described increase in equal increments of ten volts, and these voltages appear between ground and fixed contacts 104—112. The maximum voltage available between terminals 192 and 191 is thus 99 volts. Summing resistors 180 and 182 are of equal resistance, and are connected to one input terminal 200 of an amplifier 202: the other input terminal 201 is grounded at 203.

From the foregoing it will be apparent that, by the familiar principle of "parallel summing" it is possible to impress between the input terminals of amplifier 202 a voltage proportional to any number from 0 to 99, according to digitally significant perforations in record strip 100.

Connected across secondary winding 195 of transformer 194 is a voltage divider 205 having a slider 206 movable with respect to a winding 207, one end of which is grounded at 209. Slider 206 is connected to terminal 200 of amplifier 202 through a summing resistor 210, and the voltage to be supplied by winding 195 is determined by the ratio of the resistances of resistors 210 and 180. If these resistances are equal, as is preferably the case, the output of winding 195 is to be the same as that of winding 193.

Slider 206 is adjusted through a mechanical connection 211 by a motor 212 energized through a cable 213 from amplifier 202. The arrangement is such that a voltage may be supplied to terminal 200 through resistor 210 just equal in magnitude and opposite in phase to the "sum" of the voltages supplied through resistors 180 and 182. When this condition prevails, motor 212 is de-energized: for any other condition the motor is energized to adjust slider 206 until the condition of equality is once again attained. Thus the position of mechanical connection 211 is a measure of the selected bearing angle, and this connection is extended to provide a first input to a mechanical differential 214 having a second mechanical input 215 and a mechanical output 216. A compass servo system 217 of any well-known design may be used to adjust mechanical input 215 in accordance with the actual heading of the craft.

Mechanical output 216 adjusts the slider 220 of a voltage divider 221 having a winding 222 energized from the terminals of a battery 223 provided with a central ground connection 224. The arrangement is such that when the actual heading of the craft, as sensed by compass system 217, is that selected, slider 220 is located at the center of winding 222 regardless of what the actual value of the heading angle is, within the range of the instrument. Any difference between the actual and selected heading angles results in operation of inputs 211 and 215 differentially, and output 216 displaces slider 220 so that a voltage of one polarity or the other appears between the slider and ground and is applied through a summing resistor 225 to the fixed contact 226 of a normally open relay 227 the winding 230 of which actuates an armature 231 to bring a movable contact 232 into engagement with fixed contact 226. The energizing circuit for winding 230 includes a ground connection 233 and a conductor 234 connected to fixed contact 124. In the first portion of the flight the circuit is completed to battery 183 through movable contact 151, which passes through perforation 162 and engages fixed contact 124.

Movable contact 232 of relay 227 is connected to the fixed contact 235 of a further relay 236 whose winding 237 actuates an armature 240 to displace a movable contact 241 out of normal engagement with fixed contact 235 and into engagement with a further fixed contact 242, the latter being grounded at 243. Movable contact 241 is electrically connected to one input terminal 244 of a coupling unit 246: the other input terminal 245 is grounded at 247.

Coupling unit 246 is of any desired nature, which will perform the function of converting signals applied to terminals 244 and 245 into properly directed control movements of the craft. To this end it is connected through a cable 250 to the automatic pilot 251 of the craft, which provides mechanical outputs 252 and 253 to the ailerons and rudder of the craft to control its heading. One suitable coupler is shown in the co-pending application of Carpenter and Alderson, Serial No. 49,442, filed September 15, 1948, and assigned to the assignee of the present invention. This coupler includes a suitable rate insertion network for causing the craft to seek a desired path, and follow it in a desired direction, regardless of its instantaneous location and direction of movement with respect to the path.

A conductor 254 is shown in the upper left-hand corner of Figure 4, connecting input terminal 200 to one input terminal 255 of a lockout amplifier 257 having a pair of output terminals 258 and 259: the other input terminal 256 is grounded at 260, and output terminal 259 is grounded at 261. Output terminal 258 is connected to energize winding 237 of relay 236 through a conductor 262: the other end of winding 237 is grounded at 263. This arrangement is such that when the signal on terminal 200 is large—that is, when the heading angle selecting portion of the apparatus has not achieved a stable condition—a signal is transmitted through lockout amplifier 257 to energize winding 237, disconnecting input terminal 244 from slider 220 and grounding it instead. Thus no signal is supplied to automatic pilot 251 at such times, and erratic control of the craft is prevented.

In the lower central portion of Figure 4 there is shown a landing gear servo 264 which functions through a mechanical connection 265 to raise and lower the landing gear of the craft. Servo 264 is shown to have a set of input terminals including a common terminal 266 and "up" and "down" input terminals 267 and 270 which are connected respectively to fixed contacts 128 and 127. Servo 264 is conventionally of the type which remains in either of two operating conditions until energized to move into the other operating condition, and in any case when the record strip is in the position shown, a circuit for maintaining the landing gear in its "up" condition is completed from battery 186 through contacts 128 and 155, which are then in engagement through perforation 163.

In the lower central portion of Figure 4 there is shown a beacon receiver 271 having a receiving antenna 272 and a pair of output terminals 273 and 274, the latter being grounded at 275, and the former being connected to fixed contact 130.

In the lower right-hand corner of Figure 4 there is shown a relay 276 comprising a winding 277 one end of which is connected to conductor 188 and the other end of which is grounded at 280. Winding 277 actuates an armature 281 to displace a plurality of movable contacts 282, 283, and 284 into engagement with a like plurality of fixed contacts 285, 286, and 287. Movable contacts 282, 283 and 284 are energized from one terminal of a battery 290, the other terminal of which is grounded at 291. The circuit from conductor 188 is extended through a fixed contact 292 and a movable contact 293 to the winding 294 of a feeder solenoid the other end of which is connected to fixed contact 285. Feeder solenoid 294 acts through an armature 295 to pivot an arm 296 freely about a shaft 297, in opposition to the action of a spring 300. Pivotally attached to arm 296 is a pawl 301 which is urged by a spring 302 into engagement with a ratchet wheel 303 connected to drive roll 101 by mechanical connection 304. Energization of feeder solenoid 294 is thus effective to cause rotation of ratchet wheel 303 through a portion of a turn. When arm 296 has travelled in a counterclockwise direction until it comes into engagement with movable contact 293, the latter is displaced out of engagement with fixed contact 292, interrupting the circuit therebetween.

Fixed contact 286 is connected by means of a conductor 305 to the winding 237 of lockout relay 236.

Fixed contact 287 is connected by means of a conductor 306 to a lifter solenoid 307 which acts through a mechanical connection 310 to lift all of the movable contacts 131—157 out of engagement with strip 100, thus permitting easy advance of the strip by operation of the drive roll. The lifter circuit is completed through ground connection 308.

In the lower left corner of Figure 4 there is shown a navigating computer 309 supplied with a first input through a cable 310 from an omnirange receiver 311 having a receiving antenna 312, and a second input through a cable 313 from a distance measuring equipment transponder 314 having a transmitting antenna 315 and a receiving antenna 316. Computer 309 has a first pair of output terminals 317 and 320 and a second pair of output terminals 321 and 322. Terminals 320 and 322 are grounded at 323 and 324. Details of the structure and operation of one embodiment of computer 309, and its relation to units 311 and 314, are fully disclosed in my co-pending application, Serial No. 33,608, filed June 17, 1948, and assigned to the assignee of the present invention.

Output terminal 321 is connected through a battery 325 to fixed contact 129. Terminal 317 is connected through a summing resistor 326 to the movable contact 327 of a normally open relay 330 having a winding 331 energizable to actuate an armature 332 to bring the movable contacts into engagement with a fixed contact 333. One end of winding 331 is grounded at 334, and the other end is connected by means of a conductor 335 to fixed contact 126.

Just above omnirange receiver 311 in the drawing is shown an instrument landing system receiver 336 of the well-known type having a receiving antenna 337 and a pair of output terminals 340 and 341, the latter being grounded at 342. Terminal 340 is connected through a summing resistor 343 to the movable contact 344 of a normally open relay 345 having a winding 346 one end of which is grounded at 347 and the other end of which is connected through a conductor 350 to fixed contact 125. Winding 346 of the relay actuates an armature 351 to displace movable contact 344 into engagement with a fixed contact 352.

*Operation*

In describing the operation of the apparatus, let it first be assumed that the aircraft is at the point A as shown in Figure 1, that its heading angle is the angle α and that this condition has prevailed for sufficient time for the heading angle selecting portion of the apparatus to have become stabilized and for all transient effects in the automatic pilot to have died away. The position of the record strip with respect to the fixed and movable contacts is as shown in Figure 4, and under these conditions a voltage proportional to 60 units is impressed on input terminal 200 of amplifier 202 through summing resistor 180, and a voltage proportional to one unit is impressed on the input terminal through summing resistor 182. Since this system is in balance, an opposite voltage proportional to 61 units is impressed on input terminal 200 through summing resistor 210, and the potential of the input terminal itself is zero. Accordingly no input is supplied to lockout amplifier 257, and lockout relay 236 is not energized, so that an electrical connection is completed between contacts 235 and 241. Mechanical inputs 211 and 215 to differential 214 are both proportional to the number 61, and slider 220 is therefore positioned by mechanical output 216 at the center of winding 222. Accordingly no voltage appears between the slider and ground connection 224, and although the slider is connected to the input to coupler 246, by reason of the energization of relay 227 through contacts 124 and 151, no input is applied to coupler 246. Automatic pilot 251 accordingly supplies no mechanical outputs to the rudder and ailerons of the aircraft, which continues in flight under its then present condition.

The landing gear servo 264 is maintained in its "up" condition by means of contacts 128 and 155. Likewise beacon receiver 271 is connected through contacts 130 and 157 to conductor 188. However, as long as the aircraft is out of the service area of the marker beacon at point F, the beacon receiver supplies no output, and no change in the condition of the apparatus accordingly results.

As long as the heading of the craft does not change, the conditions just described continue. If by reason of a gust of wind or because of some mistrim condition in the aircraft its heading does change, mechanical input 215 from compass system 217 is also changed, and slider 220 moves along winding 222. This produces a voltage between the slider and ground, and this voltage is impressed through the contacts of relays 227 and 236 on the input to coupler 246, causing operation of the automatic pilot to adjust the rudder and ailerons sufficiently to correct the heading of the aircraft. When this is accomplished the input 215 from the compass system is restored to its former value, slider 220 is again centered on winding 222 and the apparatus resumes its former condition.

When the craft reaches the point F shown in Figure 1, it enters the service range of the marker beacon, and receiver 271 in Figure 4 provides an electrical output through contacts 130 and 157 to energize the winding 277 of relay 276.

It is now desired that the movable contacts be moved away from the fixed contacts, that the record strip be advanced, and that the movable contacts be returned to their former position, to establish a new heading control of the craft, and further that these changes be made without introducing any erratic signals into the automatic pilot. To this end relay 276 operates, completing a circuit which may be traced from the positive terminal of battery 290 through contacts 283 and 286 of the relay and conductor 305 to the winding 237 of lockout relay 236. The relay operates, disconnecting input terminal 244 of coupler 246 from fixed contact 235 and grounding it through fixed contact 242 and ground connection 243. This action is without appreciable effect on the flight of the craft, however, since the automatic pilot has caused the flight to continue all along under such conditions that the signal to coupler 246 is very small.

Relay 276 also completes a circuit which may be traced from the positive pole of battery 290 through contacts 284 and 287 of the relay, conductor 306, and winding 307 of the lifter solenoid, the circuit being completed through ground connections 308 and 291. Solenoid 307 acts through mechanical connection 310 to lift all the movable contacts out of engagement with the record strip, and thus would deenergize winding 277 of relay 276 at contacts 130 and 157. However, the operation of relay 276 has completed a third circuit which may be traced from the positive terminal of battery 290 through contacts 282 and 285 of relay 276, feeder solenoid 294, contacts 293 and 292, and winding 277 of the relay, the circuit being completed through the ground connections 280 and 291. It will be observed that this circuit completes a holding circuit for the relay, independent of the signal supply on conductor 188 from beacon receiver 271.

Energization of solenoid 294 actuates armature 295 to act on arm 296 causing rotation of ratchet wheel 303. This causes rotation of drive roll 101, displacing record strip 100 to the left as seen in Figure 4 to bring the second row of perforations into alignment with the movable and fixed contacts. When the paper has been advanced to this extent, the upper end of arm 296 engages movable contact 293, displacing it out of engagement with the fixed contact 292, and thus interrupting the holding circuit for relay 276, which is deenergized. The circuit to lifter 307 is interrupted at contacts 284 and 287, allowing the movable contacts to return into engagement with the strip or with the fixed contacts on the other side of it where there are perforations in the strip. Simultaneously feeder 294 is deenergized, and arm 296 is returned to its original position under the action of spring 300, pawl 301 moving along the surface of ratchet wheel 303 without causing backward movement of the record strip.

As soon as the movable contact is displaced out of engagement with the fixed contact, the input to amplifier 202 through conductors 180 and 182 becomes zero or indeterminate, depending upon the amount of extraneous pickup in the system, but the signal supplied to the amplifier through summing resistor 210 is initially unchanged. Accordingly the signal from this source, unbalanced by any signal from the record strip, is impressed on amplifier 202, and also, through conductor 254, on lockout amplifier 257. Thus an electrical input is supplied to lockout relay 236 to cause its operation, and this input is independent of that supplied through conductor 305.

When the movable contacts are displaced from the record strip, the circuit energizing winding 230 of relay 227 is interrupted at contacts 124 and 151, and the relay contacts disengage, cutting off slider 220 as a source of energy for coupler 246. At the same time the up signal to landing gear servo 264 is interrupted at contacts 128 and 155, but the nature of the servo is such that it remains in its set position until a further signal is received calling for a change in that position.

Even before the craft reaches the point F, signals are being received by omnirange receiver 311 and D. M. E. transponder 314 and are being supplied to a navigating computer 309. The computer supplies at terminals 317 and 320 a voltage proportional to the lateral displacement of the craft from the line CD. When lifter 307 is deenergized and the movable contacts are allowed to return to their normal positions, a circuit is completed from battery 183 through contacts 153 and 126 and conductor 335 to winding 331 of relay 330. The relay is actuated, and a circuit is completed from summing resistor 326 through contacts 327 and 333 to contact 235 of lockout relay 236. The circuit to winding 237 of this relay through conductor 305 and contacts 286 and 283 of holding relay 276 has been broken upon deenergization of the holding relay, but lockout relay 236 is maintained in its operated condition by lockout amplifier 257, grounding the input to coupler 246, until the heading angle selecting system is satisfied.

It thus becomes of practical importance to have some sort of a called for heading included in each set of perforations in the record strip, even though the craft's heading is to be controlled from some other device, since allowing resistors 180 and 182 to float impresses erratic voltages on the input of amplifier 202, and may result in energization of lockout amplifier 257 sufficient to operate the lockout relay. In Figure 4 perforations 168 and 169 in the heading angle selecting portion of the record, act to ground summing resistors 180 and 182. Accordingly, when motor 212 has operated to bring slider 206 to the bottom of winding 207 the voltage at input terminal 200 is zero, the lockout amplifier is deenergized, and the lockout relay is no longer supplied with electrical energy from any source. Movable contact 241 disengages fixed contact 242 and reengages fixed contact 235: a circuit is now completed supplying the output from navigating computer 309 to coupler 246.

As described in my co-pending application last referred to above, computer 309 supplies at terminals 317 and 320 a voltage which varies in phase and amplitude with the sense and amount of the departure of the craft from the line CD: lateral control of the craft is henceforth exercised in accordance with the output from the navigating computer.

It is obvious that the actual heading of the craft as sensed by compass system 217 is not true north but it is at a considerable angle displaced therefrom. Slider 220 as a result is widely displaced from its central position, and a considerable voltage is applied through summing resistor 225 to fixed contact 226 of relay 227. The relay is deenergized however, so that no effect is accomplished by the presence of this voltage.

The energization of the up function of landing gear servo 264 through contacts 128 and 155 is again established, through perforation 166, when the tape is advanced to its second position. The circuit from the beacon receiver is no longer completed, however, and instead of that output terminal 321 of navigating computer 309 is connected through battery 325 and contacts 129 and 156 to conductor 188.

As also described in my co-pending application last referred to, terminals 321 and 322 of navigating computer 309 are connected internally of the computer to a switching arrangement which interrupts the circuit between the input terminals at all times except when the craft has reached a way point such as point E in Figure 1. When the craft reaches a way point, however, the navigating computer completes a circuit between input terminals 321 and 322, so that electrical energy from battery 325 may be conducted through ground connections 321 and 280 and through contacts 129 and 156 to the winding of relay 276.

From the foregoing discussion it will be apparent that when the craft reaches the point F its lateral control in accordance with magnetic heading selected by perforations in the record strip is interrupted, and after an interval required for operation of the paper advancing mechanism and for balancing of the heading selecting portion of the apparatus, lateral control of the craft is established in the navigating computer in accordance with signals from transmitter T₁. The fact that the craft is displaced from the line CD results in a signal being supplied from navigating computer 309 and this signal acts through coupling unit 246 on automatic pilot 251 to cause the craft to turn off the line AB and to come onto the line CD. Thereafter, departure of the craft from the line CD results in signals from navigating computer 309 suitable to cause the craft to return to the line, and this condition prevails until the craft reaches the point E, at which time computer 309 completes the circuit for energizing holding relay 276, and operation of lifter 307, feeder 294, and lockout relay 236 takes place as described above to advance the record strip to its third position, bringing perforations 170, 171, 172, 173, and 174 into alignment with the movable and fixed contacts.

In this third portion of the flight, the bearing angle β of the craft is 44°, and voltages proportional to 40 units and to 4 units are supplied to summing resistors 180 and 182 through contacts 109 and 136 and contacts 119 and 146. Motor 212 operates until an equal and opposite voltage is supplied by slider 206, thus setting mechanical input 211 to differential 214, and thus reducing to zero the voltage on input terminal 200 of amplifier 202. As previously described, this results in deenergization of lockout relay 236 from lockout amplifier 257, and the deenergization of holding relay 276 consequent upon operation of contacts 293 and 292 by arm 296 has already disconnected the lockout relay from battery 290, so that the lockout relay is fully deenergized and coupler 246 is connected to movable contact 232 of relay 227. This latter relay is now energized from battery 183 through perforation 172 in chart 100, the circuit being completed through contacts 124 and 151 as previously described. If the actual heading of the craft as sensed by the compass is not that selected, mechanical inputs 211 and 215 are not equal and opposite, and slider 220 is displaced from its central position, supplying a signal to coupler 246 through summing resistor 225, and the heading of the craft is changed until it has the desired value.

The landing gear servo is maintained in its up condition by engagement between contacts 128 and 155 through perforation 173, and the preparatory circuit for control of the paper feeding mechanism by means of beacon receiver 271 is also established through perforation 174 by contacts 130 and 157. The craft now proceeds as described in the discussion of the first section of the flight, except that its selected bearing is now 44 degrees rather than 61 degrees.

The craft moves along the line OS until it enters the field of the marker beacon at S. The signal from beacon receiver 271 causes operation of holding relay 276, lifter 307, feeder 294, and lockout relay 236 just as described in connection with the marker beacon at point F, and the record strip is advanced so that the fourth row of perforations is aligned with the movable and fixed contacts. Perforations 178 and 179 in this set correspond to perforations 168 and 169 in the second set and function to provide an invariable voltage for slider 206 to be balanced against. Perforation 175 is positioned to allow engagement between contact 125 and contact 152, completing the circuit from battery 183 to winding 346 of relay 345. The relay operates, supplying the output voltage from I. L. S. receiver 336 through summing resistor 343 to fixed contact 235 of lockout relay 236. When the relay is deenergized, as previously described, the lateral control of the aircraft through coupler 246 is exerted by I. L. S. receiver 336, and the craft turns from the line OS and comes onto the line LK at some point U.

At the time the craft departs from the line PQ it is sufficiently close to its touchdown point on the airstrip K that the landing gear should be lowered. Accordingly perforation 175 is provided, to permit engagement between contact 127 and contact 154 and hence to energize the down function of landing gear servo 264 from battery 185.

Since this is the last portion of the extended flight, and no new sequence is subsequently to be initiated, no perforation is provided in the sequence initiation portion of the record strip.

From the foregoing description and the drawing it will be obvious that I have invented means for successively controlling the heading of an aircraft in accordance with signals supplied from a "punched card" type of record strip, which has never been accomplished prior to this time. It will also be obvious that I have provided a related new contribution in servo systems, not limited specifically to aircraft heading control, but of general applicability wherever it is desired to control a single device, whether it be the yaw attitude of an aircraft or the position of a cutter on a milling machine, in a succession of distinguishable fashions, without providing as great a multiplicity of signal sources as there are fashions in which the control is to be exerted. It will be obvious that only one voltage divider similar to unit 221 in Figure 4 is necessary to control an output device which may be represented by automatic pilot 251 in Figure 4 to any unlimited number of positions, and this is the second basic contribution in the present invention.

Numerous objects and advantages of my invention have been set forth in the foregoing description, together with details of the structure and function of the invention, and the novel features thereof are pointed out in the appended claims. The disclosure, however, is illustrative only, and I may make changes in detail within the principle of the invention to the full extent indicated by the broad general meaning of the terms in which the appended claims are expressed.

I claim as my invention:

1. Flight control apparatus of the class described comprising, in combination: first and second records each having a field of perforations representative of desired characteristics of flight of a dirigible craft in a selected portion of an extended flight, each said field including a lateral control selecting portion, a heading angle selecting portion, and a sequence initiation selecting portion; means for supplying a signal upon departure of the craft from a desired path; means for supplying a signal in accordance with deviation of the heading of the craft from that represented by the perforation of the heading angle selecting portion of said field; means connected to the above named means for controlling the heading of the craft in accordance with one of said signals as determined by the perforation of said lateral control selecting portion of said field; a plurality of sources supplying signals each indicating that the craft has achieved a selected condition of flight; and means, connected to said source and actuated in accordance with one of said last-named signals determined by the perforation of said sequence initiation selecting portion of the field of the first named record, for replacing said first record with said second record.

2. Flight control apparatus of the class described comprising, in combination: a record strip having successive fields of perforations representative of desired characteristics of flight of a dirigible craft in successive selected portions of an extended flight, each said field including a lateral control selecting portion, a heading angle selecting portion, and a sequence initiation selecting portion; means including a bank of perforation sensing members adjacent said strip for converting perforations in said strip to completed electrical circuits; means for supplying a signal in accordance with departure of the craft from a desired path; means for supplying a signal in accordance with deviation of the heading of the craft from that represented by the perforation of the heading angle selecting portion of said field; means connected to the above named means for controlling the heading of the craft in accordance with one of said signals determined by the circuit completed by the perforation sensing members in the lateral control selecting portion of said field; a plurality of sources supplying further signals indicating that the craft has achieved a selected condition of flight;

and means, connected to said sources and actuated in accordance with one of said further signals determined by the circuits completed by the perforation sensing members in the sequence initiation selecting portion of said field, for advancing said strip to remove the first field of perforations from said converting means and replace it with a succeeding field of perforations.

3. Flight control apparatus of the class described comprising, in combination: a record strip having successive fields of perforations representative of desired characteristics of flight of a dirigible craft in successive selected portions of an extended flight, each said field including a control portion and a sequence initiation selecting portion; means including a bank of perforation sensing members adjacent said strip for converting perforations in said strip to completed electrical circuits; a plurality of sources supplying signals each indicating that the craft has achieved a selected condition of flight; and means connected to one of said sources, determined by said perforation sensing members in the sequence initiation selecting portion of said field, for advancing said strip so that a successive field of perforations is brought adjacent said bank of said sensing members.

4. Flight control apparatus of the class described comprising, in combination: a record strip having successive fields of perforations representative of desired characteristics of flight of a dirigible craft in successive selected portions of an extended flight, each said field including a control portion and a sequence initiation selecting portion; means including a bank of perforation sensing members adjacent said strip for converting perforations in said strip to completed electrical circuits; means energized through the circuits completed by the sensing members adjacent said control portion of said record to control a characteristic of the flight of the craft; a plurality of sources supplying signals each indicating that the craft has achieved a selected condition of flight; and means connected to one of said sources, determined by said perforation sensing members in the sequence initiation selecting portion of said field, for advancing said strip so that a successive field of perforations is brought adjacent said bank of said sensing members.

5. Control apparatus of the class described comprising, in combination: a record means having fields of perforations representative of desired values of variables in successive selected steps of a control sequence, each said field including a control portion and a sequence initiation selecting portion; means, including a bank of perforation sensing members and means positioning said record means so that one of said fields is adjacent thereto, for converting perforations in said record means to completed electrical circuits; a plurality of sources supplying signals each indicating that a variable of said control sequence has achieved a selected value; and means connected to one of said sources, determined by said perforation sensing members of the sequence initiation selecting portion of said field, for repositioning said record means so that another field of perforations is brought adjacent said bank of said sensing members.

6. Control apparatus of the class described comprising, in combination: record means having successive fields of perforations representative of desired values of variables in successive selected steps of a control sequence, each said field including a control portion and a sequence initiation selecting portion; means including a bank of perforation sensing members adjacent said record means for converting a first of said fields of perforations in said record means to completed electrical circuits; means energized through the circuits completed by the sensing members adjacent said control portion in said record means to control a variable of said control sequence; a plurality of sources supplying signals each indicating that a variable of said sequence has achieved a selected value; and means connected to one of said sources, determined by said perforation sensing members in the sequence initiation selecting portion of said first field, for advancing said record means so that another field of perforations is brought adjacent said bank of said sensing members.

7. Control apparatus of the class described comprising, in combination: record means having fields of perforations representative of predetermined values of variables in successive selected portions of an operational performance pattern, each said field including a control portion and a sequence initiation selecting portion; means, including a bank of perforation sensing members and means positioning said record means adjacent thereto, for converting perforations in said record means to completed electrical circuits; a plurality of sources supplying signals each indicating that a variable in said performance pattern has achieved a selected value; and means connected to one of said sources, determined by said perforation sensing members of the sequence initiation selecting portion of said field, for adjusting said record means so that another field of perforations is brought adjacent said bank of said sensing members.

References Cited in the file of this patent

UNITED STATES PATENTS

| | | |
|---|---|---|
| 2,322,225 | Crane et al. | June 22, 1943 |
| 2,551,972 | Schaelchlin et al. | May 8, 1951 |
| 2,576,903 | Imm | Nov. 27, 1951 |
| 2,580,768 | Hamilton et al. | Jan. 1, 1952 |
| 2,582,588 | Fennessy et al. | Jan. 15, 1952 |
| 2,656,497 | Schweighofer et al. | Oct. 20, 1953 |

OTHER REFERENCES

Automatic Controls for Pilotless Ocean Flight, December 1947, Electronics, pages 88–92.